US012572657B2

(12) United States Patent
Nabeel et al.

(10) Patent No.: US 12,572,657 B2
(45) Date of Patent: Mar. 10, 2026

(54) GENERATING HIGH-QUALITY THREAT INTELLIGENCE FROM AGGREGATED THREAT REPORTS

(71) Applicant: Qatar Foundation for Education, Science and Community Development, Doha (QA)

(72) Inventors: Mohamed Nabeel, Doha (QA); Saravanan Thirumuruganathan, Doha (QA); Euijin Choo, Doha (QA); Issa M. Khalil, Doha (QA); Ting Yu, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 651 days.

(21) Appl. No.: 18/087,290

(22) Filed: Dec. 22, 2022

(65) Prior Publication Data

US 2023/0205884 A1      Jun. 29, 2023

Related U.S. Application Data

(60) Provisional application No. 63/294,163, filed on Dec. 28, 2021.

(51) Int. Cl.
*G06F 21/56* (2013.01)
*G06N 5/00* (2023.01)

(52) U.S. Cl.
CPC ............. *G06F 21/566* (2013.01); *G06N 5/00* (2013.01); *G06F 2221/034* (2013.01)

(58) Field of Classification Search
CPC ... G06N 21/566; G06N 5/00; G06F 2221/034

USPC .......................................................... 706/45
See application file for complete search history.

(56) References Cited

U.S. PATENT DOCUMENTS

| | | | | |
|---|---|---|---|---|
| 9,978,067 | B1 * | 5/2018 | Sadaghiani | ......... H04L 63/1416 |
| 10,997,608 | B1 * | 5/2021 | Veeraraghavan | ....... G06F 9/541 |
| 2021/0273959 | A1 * | 9/2021 | Salji | .................... H04L 63/1416 |

OTHER PUBLICATIONS

Huang, et al., "ITDBERT: Temporal-semantic representation for insider threat detection", 2021 ISCC, Sep. 5-8, 2021 (Year: 2021).*
Liu, et al., "Anomaly-based insider threat detection using dep autoencoders", 2018 IEEE International Conference on Data Mining Workshops (ICDMW), 2018 (Year: 2018).*
Yu, et al., "Securing critical infrastructures: deep-learning-based threat detection in IIIT", IEEE Communications Magazine, Oct. 2021 (Year: 2021).*
Zhu, et al. "Measuring and Modeling the Label Dynamics of Online Anti-Malware Engines"; usenix; Aug. 2020; (19 pages).

(Continued)

*Primary Examiner* — Tsu-Chang Lee
(74) *Attorney, Agent, or Firm* — K&L Gates LLP

(57) ABSTRACT

Generating high-quality threat intelligence from aggregated threat reports is provided via developing a generative model that identifies relationships between a plurality of threat assessment scanners; pre-training a plurality of individual encoders based on a corresponding plurality of pretext tasks and the generative model; combining the individual encoders into a pre-trained encoder; fine-tuning the pre-trained encoder using threat data; and marking a candidate threat, as evaluated via the pre-trained encoder as fine-tuned, as one of benign or malicious.

19 Claims, 5 Drawing Sheets

(56) References Cited

OTHER PUBLICATIONS

Sharif, et al.; "Predicting Impending Exposure to Malicious Content from User Behavior"; CCS; 2018; (15 pages).
Zhang, et al.; "A Survey on Multi-Task Learning"; IEEE; 2021; (20 pages).
Kantchelian, et al.; "Better Malware Ground Truth: Techniques for Weighting Anti-Virus Vendor Labels"; ACM; 2015; (12 pages).
Yoon, et al.; "VIME: Extending the Success of Self- and Semi-supervised Learning to Tabular Domain"; 34th Conference on Neural Information Processing Systems; 2020; (11 pages).
Thirumuruganathan, et al.; "SIRAJ: A Unified Multi-Source Aggregation Framework for High-Quality Threat Intelligence"; IEEE; 2022; (4 pages).

* cited by examiner

400

410 — Develop Generative Model to Identify Relationships Between Threat Assessment Sources 420 — Pre-train Generative Model Based on Pretext Tasks 430 — Combine Pretext Models into Pretrained Encoder 440 — Fine Tune Encoder Using Threat Data 450 — Evaluate Candidate Threat 450 — Mark Candidate Threat as Malicious or Benign

GENERATING HIGH-QUALITY THREAT INTELLIGENCE FROM AGGREGATED THREAT REPORTS

CROSS-REFERENCES TO RELATED APPLICATIONS

The present disclosure claims priority to U.S. Provisional Patent Application No. 63/294,163 filed on Dec. 28, 2021 and entitled "Methods And Techniques To Generate High-Quality Threat Intelligence From Aggregated Threat Reports", which is incorporated by reference in its entirety.

BACKGROUND

High-quality Internet threat indicators are important for both security practitioners and the research community. Due to the scale of the Internet and the fast-evolving landscape of threats, many indicators do not rely on a single system for their analysis. Rather, to produce comprehensive and accurate results, current technology will aggregate the results of several systems. For example, one type of indicator will label entities as malicious if it is marked by a number of sources above a certain threshold. Often, this results in sub-optimal performance as the system assumes that all sources are of similar quality and expertise, which is uncommon in practice. Further alternatives, such as supervised machine learning models, require a large amount of manually labeled data, which is time-consuming to collect and has to be updated frequently leading to substantial recurring costs.

SUMMARY

The present disclosure generally relates to a threat detector for use in computing environments.

In various embodiments, the present disclosure provides a method including various operations, a system including a processor and a memory storage device that includes instructions that the processor executes to perform various operations, and a computer readable memory storage device that includes instructions that when executed by a processor perform various operations, wherein the operations include: developing a generative model that identifies relationships between a plurality of threat assessment scanners; pre-training a plurality of individual encoders based on a corresponding plurality of pretext tasks and the generative model; combining the individual encoders into a pre-trained encoder; fine-tuning the pre-trained encoder using threat data; and marking a candidate threat, as evaluated via the pre-trained encoder as fine-tuned, as one of benign or malicious.

The reader will appreciate the foregoing details, as well as others, upon considering the following detailed description of certain non-limiting embodiments including a method of detecting threats according to the present disclosure.

DETAILED DESCRIPTION

Figure 1:
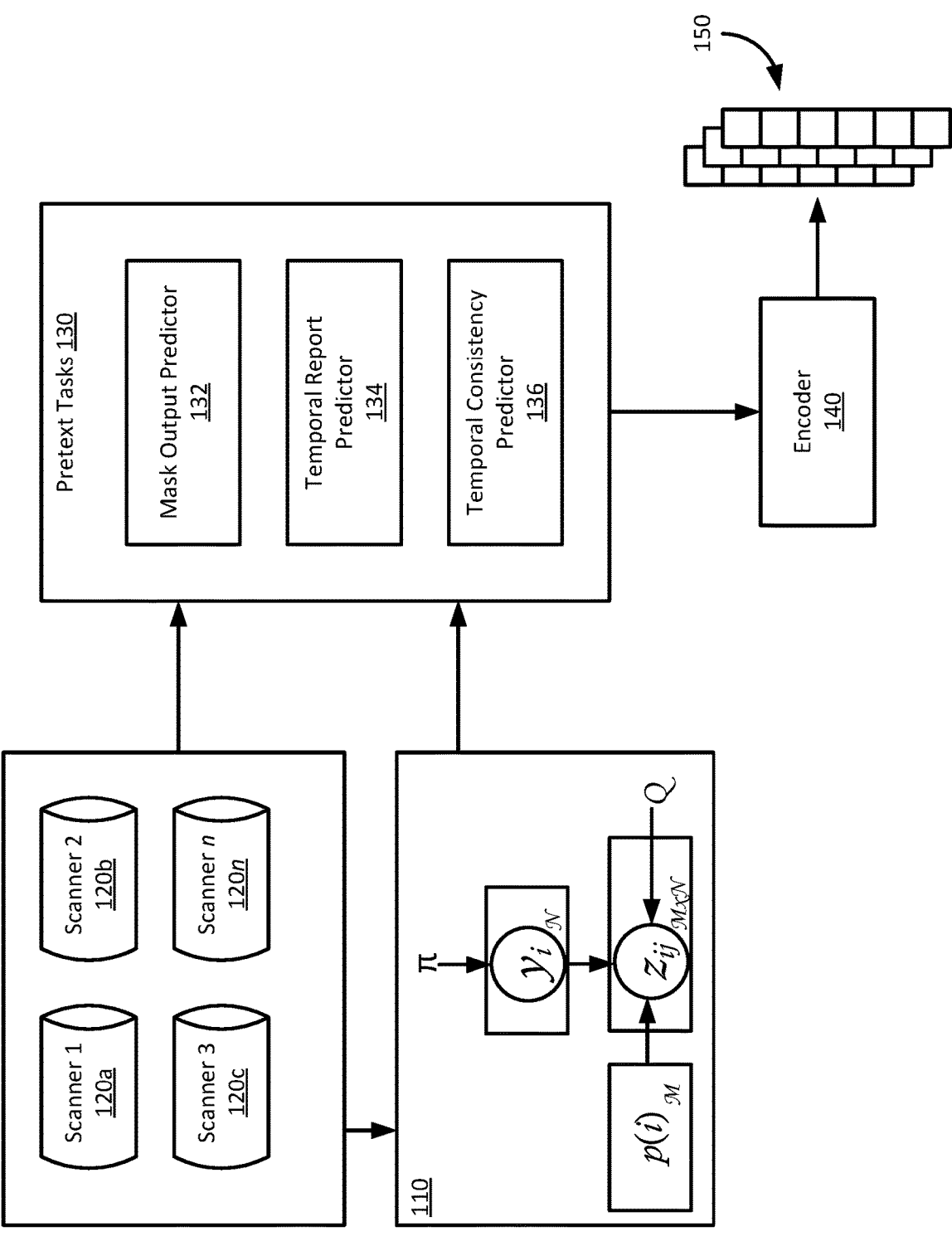
FIG. 1 illustrates a computing environment 100 for generating high-quality threat intelligence from aggregated threat reports, according to aspects of the present disclosure.

The present disclosure generally relates to a threat detector for use in computing environments.

A conventional threat detector displays various disadvantages in the process of detecting threats. For example, conventional indicators label entities as malicious if those entities are marked as threats by at least a threshold number of threat assessment sources, which may inaccurately assume that all threat assessment sources are of similar quality and expertise, which is uncommon in practice. Other alternatives for threat detection, such as supervised machine learning models, require a large amount of manually labeled data, which is time-consuming to collect and has to be updated frequently. The presently described threat detector improves on these threat detectors by developing a generative model for aggregating threat data, pre-training the generative model, and fine-tuning the model. The generative model is capable of learning the dependencies between scanners based on a factor graph and uses a data driven approach to develop the model without directly using the latent variables for aggregation.

In the pre-training operation, the generative model is altered to teach the model about the granular details of scanner dynamics for accurate aggregation. In some embodiments, teaching the model includes three inter-related pretext tasks. The first task learns the dependencies between the scanners when generating the scan report for an entity, the second task models the temporal dynamics of scanner responses, and the third task learns embeddings that are temporally consistent.

After pre-training, the encoder may take a scan report and generate an embedding for use by various downstream tasks, such as detection and clustering threats, and may fine-tune the model. In a first fine-tuning scenario, when a limited number of labeled data are available, the encoder uses a semi-supervised approach to train a discriminative model. In a second fine-tuning scenario, when no labeled data are available, the model uses the properties of the embedding space to design an unsupervised classifier.

The present disclosure therefore provides benefits in the field of computational security against various threats and malicious parties including, malware files, malicious domains, malware uniform resource locators (URLs) or internet protocol (IP) addresses, and other malicious actors to prevent security breaches, reduce the severity of security breaches, or increase the speed at which reactive measures are deployed to contend with security breaches.

In contrast to conventional threat scanners or threat aggregators that focus on a particular type of entities, the generality of the presently described approach enables end user to detect and react to various types of entities (e.g., phishing URLs, malware URLs, malware files, and blacklisted IP addresses) via a single detector. The presently described detector is designed via three pretext tasks for self-supervised to learn the dependencies between intelligence sources and temporal dynamics across time to produce a single embedding that is consistent with all three of these tasks.

As used herein, the term entity is used to refer to objects that could be either benign or malicious and may be used in attacks (e.g. binaries, domains, URLs and IP addresses) and the term scanner is used to refer to a source of threat intelligence of a certain type of entity (e.g. an antivirus engine, an IP blacklist, a domain reputation system). When queried about an entity e, a scanner report an individual assessment of e, which, may indicate whether entity e is classified as malicious, benign, or not enough information is provided to confidently identify entity e as malicious or benign. The assessment from all scanners together form the scan report Re of the entity e. As used herein, the term label denotes the maliciousness or benignness of an entity. Accordingly, the scan report Re for an entity e gathered from scanners may be understood as a vector of dimension n containing the assessment from each scanner for e.

In some embodiments, multiple scan reports for an entity can be gathered over time period T, such that Re(t) represents the scan report for entity e at time t within time period T. The time series can be used to understand the temporal dynamics of scan reports.

FIG. 1 illustrates a computing environment 100 for generating high-quality threat intelligence from aggregated threat reports, according to aspects of the present disclosure. The computing environment receives scan reports from various scanners 120a-n, (generally or collectively, scanners 120), which may be various services that provide scan reports. Understanding the dependencies between the scanners 120 (using a generative model 110) is useful for aggregating the scanner outputs. However, directly using generative models 110 in traditional workloads often fails due to the impedance mismatch between modeling assumptions and the real-world. Therefore, instead of using the generative model 110 for prediction, the present disclosure uses the generative model 110 to learn the dependencies and dynamics exhibited by the scanners 120 and their labels. The developed generative model 110 is used to inject domain knowledge into the self-supervised learning tasks.

The generative model 110 uses an unsupervised approach that can learn the dependencies at the corpus level; however, learning more granular details about the dynamics of the scanners 150 can further improve the accuracy of aggregation. The present disclosure achieve this granular learning by designing three inter-related pretext tasks 130 that imbue an embedding model with knowledge about dependencies between scanners and their temporal dynamics.

The first task model is a masked output predictor 132 that seeks to learn the dependencies between the scanners when generating the scan report for an entity. While the first task 132 superficially looks similar to that of a generative model, they both learn the scanner dependencies at different granularities. For example, a generative model might learn that scanners 120a and 120b have high correlation in their reports. On the other hand, the first task model can learn that the output of 120b for a particular entity could be predicted from the output of 120a. The second task model is a temporal report predictor 135 that tackles the disconnect between early and late scan reports of a new entity (e.g., phishing or malware URL) by modeling the temporal dynamics of scanner responses. The third task model is a temporal consistency estimator 136 that learns embeddings 150 that are temporally consistent. The present disclosure uses a multi-task approach to learn embeddings 150 that are simultaneously well suited for all pretext tasks.

A principled approach for aggregating unlabeled data is generative models 110. The key insight is to model the process by which the unlabeled data (e.g. scan reports) were generated. The present disclosure treats the true label of a scan report (malicious or benign) as a latent variable that generates the observed and possibly noisy scan report, which contrasts with traditional approaches that try to model the true label given the noisy scan report. Once the parameters of an appropriate generative model 110 have been fitted using the unlabeled data, the present disclosure uses the generative model 110 to estimate the latent true label of a scan report. This approach is counter intuitive—yet yields accurate results if the generative model 110 is appropriately configured.

The present generative model 110 for learning the dependencies between scanners 120 is based on a factor graph. Such graphs consist of two types of nodes—variable nodes corresponding to scanners 120 and their outputs, and factor nodes that define the relationships between variable nodes. For example, the algorithm could designate two scanners $s_i$ and $s_j$ as related by creating a new factor node $f_k$ connecting to both $s_i$ and $s_j$. This simple graph structure is expressive enough to model arbitrary relationships, including high order dependencies. The present disclosures considers pairwise and conjunctive dependencies; however, the number of dependencies explodes with the increasing number of scanners 120. For example, even if the present disclosure is confined to pairwise dependencies between any pair of scanners 120, with a corpus of 70 scanners, more than 2500 such dependencies would exist, and one would need a huge amount of data to reliably identify which of these potential dependencies are relevant/irrelevant.

The generative model 110 learns the dependency structure via an optimization formulation for estimating the log marginal pseudo-likelihood of the output of a single scanner 120 conditioned on the outputs of all other scanners 120. Additionally, once the dependency structure is known, the generative model 110 is broken into smaller sub-problems, which learn the parameter values through closed-form solutions. This approach allows one to learn the parameters in time, linearly in the size of the data, which is appealing in a domain where the unlabeled data is abundant.

Given an unlabeled dataset of scan reports for various entities, the goal of the first pretext task is to learn the high level dependencies between scanners 120. A simple but intractable approach would be to collect some summary statistics such as correlations between scanners 120. Given the large number of potential correlations, an alternate and more tractable reformulation is needed. Accordingly, the present disclosure formulates this learning task as a self-supervised learning problem. With a given dataset of scan reports for m entities over n scanners 120. Let $p \in (0, 1)$ be a hyper-parameter. Given a scan report $R_e$ for entity e of dimensionality n (one entry per scanner 120), the model generates a binary mask vector $M_e$ of dimensionality n where each component takes the value of 1 with probability p. For example, if p=0:1 and n=80, then one would expect 10% of the mask vector $M_e$ to be 1.

Given $M_e$, the model transforms the scan report $R_e$ such that whenever $M_e[i]=1$, then $R_e[i]$ is corrupted by 'swap noise'—such that the model replaces $R_e[i]$ with the corresponding entry from $R_{e'}[i]$ where $R_{e'}$ is a randomly chosen scan report from the unlabeled dataset. Let $R^c_e$ be the version of $R_e$ that is corrupted based on $M_e$. The model designs a pretext task that can output the original scan report $R_e$ from the corrupted scan report $R^c_e$. Note that one could generate virtually unlimited labeled data by generating multiple corrupted versions for each scan report $R_e$.

The learning task is performed in two phases. First, the model pass $R^c_e$ to an encoder that outputs an embedding $z^1_e$. Next, the model trains a predictor that takes $z^1_e$ as input and outputs $R_e$. Joint learning is used where the back-propagation improves both components. To do well on this pretext task, the SSL has to design an appropriate encoder and also learn the various dependencies between the scanners 120. For example, assume that scanners 120a; 120b; 120c exhibit high correlation between their responses, and that $R_e[120a]$ is corrupted. Then the predictor could learn to fix it through the dependencies with $R_e[120b]$ and $R_e[120c]$.

The first Pretext task takes a single scan report $R_e$ and learns the dependencies within the scan report $R_e$. The goal of the second pretext task is to learn the dependencies across time. Suppose that $R^t_e$ and $R^{t+\delta}_e$ are the scan reports for the same entity e for time t and t+δ. The model uses an SSL task that takes $R^t_e$ as input and produces $R^{t+\delta}_e$ as output. In other words, the model seeks to predict the 'future' scan report from the current report. This task is useful for two reasons. First, while it is often challenging to determine whether an entity e is malicious from an early scan report, it is usually much easier after a certain period has elapsed (dubbed the stabilization period). Second, this pretext task results in the predictor 134 learning both the scanner and label dynamics. If a first scanner 120a often flip-flops or lags behind a second scanner 120b, this behavior will be learned by the predictor 134. Once again, the model uses a two-step process where $R^t_e$ is passed to the encoder to get $z^2_e$, which is then passed to the predictor 134 with an expected output of $R^{t+\delta}_e$. In this example, δ is a hyper-parameter and depends on the domain at hand.

The granularity of δ could be in hours for fast moving domains such as Phishing URLs while it could be in days for other domains. One may obtain the value of δ by analyzing a time series of scan reports and identifying the appropriate periodicity that captures major inflection points. For example, after a malware file is submitted to a traditional aggregation service for scan reports for four weeks, the scanners' labels become stable and do not exhibit any hazardous flips. Therefore, the value of δ should be much lower than four weeks.

When considering Temporal Prediction Consistency, let $R^t_e$, $R^{t+\delta}_e$, $R^{t+2\delta}_e$, . . . be a time series of scan reports for the same entity e. For example, these could be the reports for the same entity taken every δ=6 hours. Recall that the first pretext task learns the scanner dependencies, and the second pretext task seeks to predict the future scan report from the current one. A useful additional constraint is to ensure that the embeddings for the same entity across consecutive timestamps are sufficiently similar so that a predictor 136 is likely to make the same prediction for each of the scan reports in the time series. This constraint is motivated by the fact that the benignness/maliciousness of an entity does not change as long as δ is relatively small. If the entity is malicious, the models learn embeddings such that the predictor 136 can provide consistent predictions for that entity across the time series. Similarly, if the entity is benign, the predictor 136 is expected to give the same label consistently across the time series. By ensuring that the embeddings are similar across time, the predictor 136 is able to provide accurate and early predictions, which are achieved through a consistency loss that penalizes two temporally consecutive embeddings $R^{t+\delta}_e$, $R^{t+2\delta}_e$, based on their Euclidean distance. Embeddings 150 that are further are penalized more than those that are closer together.

In a typical SSL setting, one designs a single pretext task and uses the learned encoder 140 for computing the embeddings 150. However, the complexity of the cyber security domain in terms of scanner dependencies and temporal dynamics precludes this simple approach. Instead, the present disclosure provides a design using three inter-related pretext tasks 130, each of which focuses on different yet relevant facets of the problem. Each of these pretext tasks

130 takes a scan report $R_e$ as input and uses an encoder to output an embedding $z_e$ that is used by the predictor 132/134/136 of the individual pretext task, which creates a new challenge of harmonization to constrain the individual encoders to learn embeddings 150 that are useful across the tasks. This harmonization is achieved through the use of multi-task SSL. Each of these three tasks are learned simultaneously and force the individual encoders to share the knowledge across these tasks. Accordingly, the combined models learn a shared representation between the tasks enabling the combined model to generalize better results by ignoring data-dependent noises. Even though the tasks are sufficiently different, they also share several commonalities that result in increased efficacy of learning shared representations and thereby achieve superior prediction accuracy than training task-specific models individually. The same model architecture is used for the encoder for all three tasks, and that use soft parameter sharing where each of the encoders has its own internal parameters. However, the models try to minimize the distance between the parameters to encourage similarity between the models.

Figure 2:
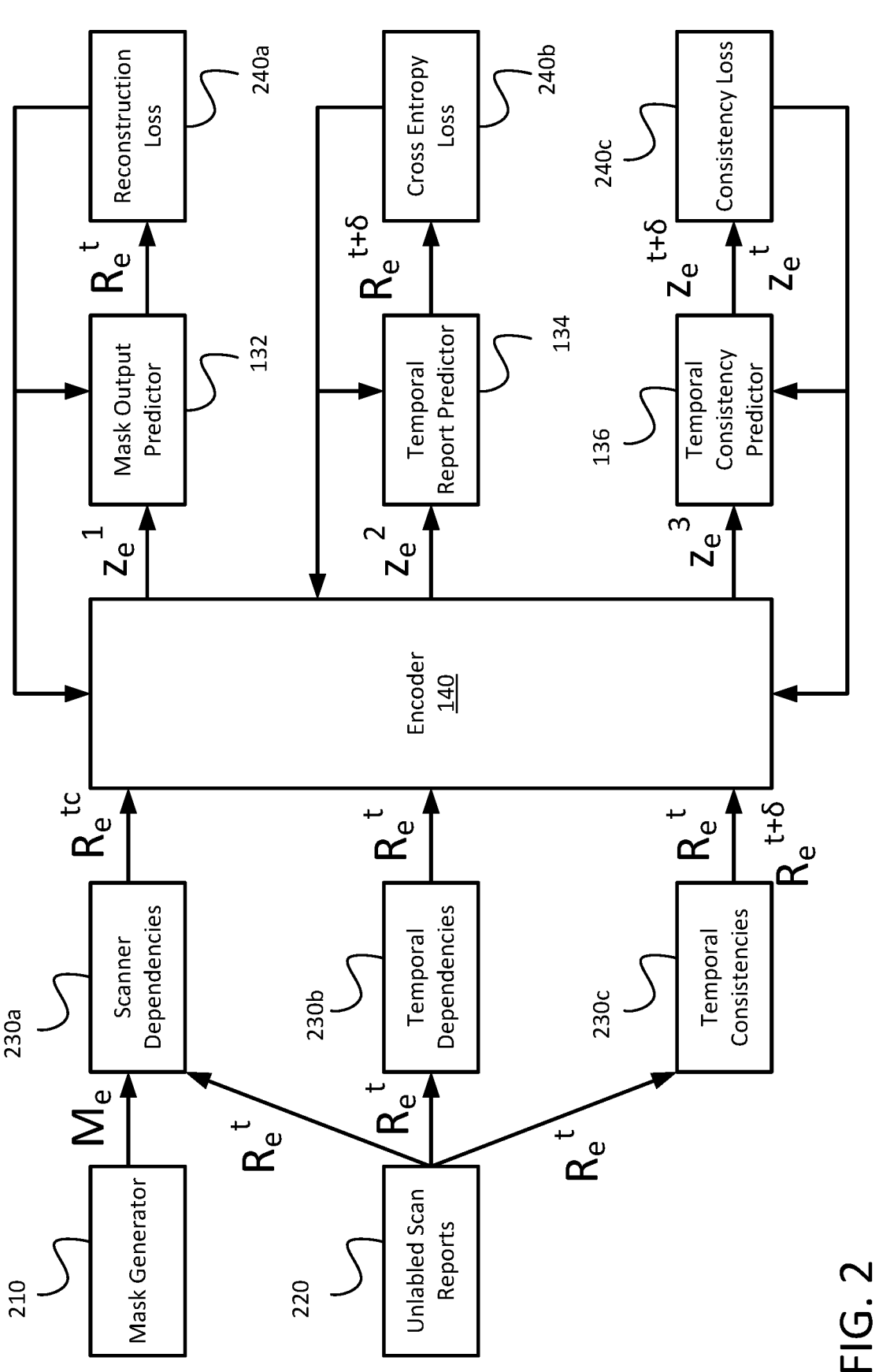
FIG. 2 illustrates the self-supervised approach, according to aspects of the present disclosure.

FIG. 2 illustrates the self-supervised approach, according to aspects of the present disclosure. An unlabeled scan report repository or source 220 passes an unlabeled scan report $R_e$ to the pretext generators 230a-c (generally or collectively, pretext generator 230) for each of the three pretext tasks. A mask generator 210 passes a mask $M_e$ to the first pretext generator 230a, which corrupts the scan report $R_e$ based on the mask $M_e$ while the other two generators (230b, 230c) function as an identity function by passing the input $R_e$ without modification. The corrupted and original scan reports are passed to the encoders 140 to generate embeddings $z_e^1$, $z_e^2$, and $z_e^3$ that are then fed to the task specific predictors 132-136. The system then applies the pretext task-specific loss function 240a-c (generally or collectively, loss function 240) on the predicted output and applies back propagation to improve upon both the encoder 140 and the respective predictor 132-136. The parameters of the encoder 140 are weakly tied based on regularization so that they do not stray widely. Overall, the self-supervised training is performed without any labeled data, thereby resulting in a generalized encoder 140 that takes a scan report and produces an embedding 150.

Figure 3:
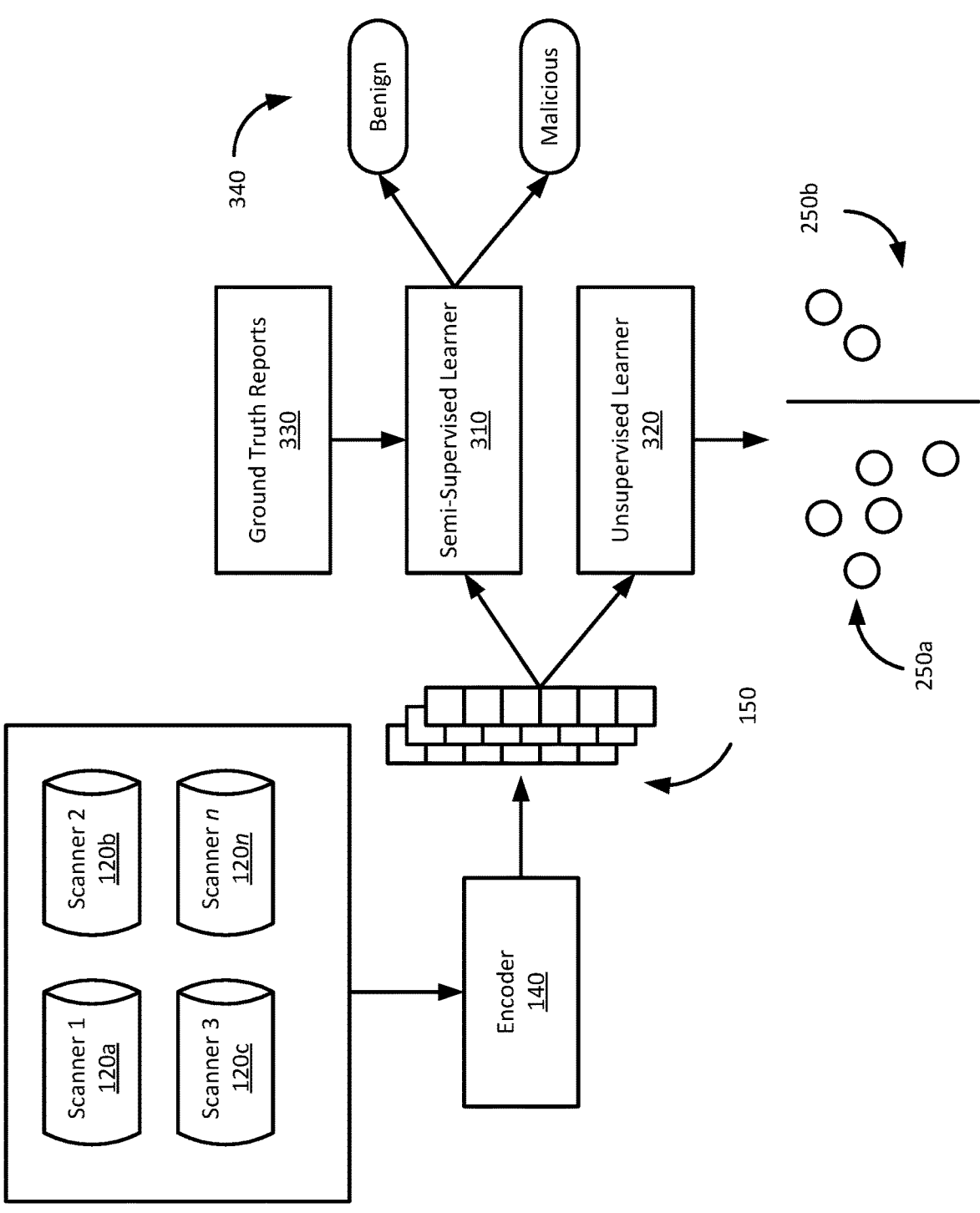
FIG. 3 illustrates a fine-tuning operation, according to aspects of the present disclosure.

Given a scan report $R_e$, the goal of the system is to output whether the entity e is malicious or benign as quickly as possible. This goal may be understood in two scenarios— one where there is limited labeled data available, and another with no labeled data available. The present disclosure uses solution approach based on the pre-train and fine-tune paradigm, which uses the generative model 110 and the SSL tasks to teach/train an encoder 140 in the pre-training operation that is "good enough", as discussed in relation to FIG. 1. In the fine-tuning operation, shown in FIG. 3, the encoder 140 and its embeddings 150 are leveraged for early and accurate detection.

In the scenario using Limited Labeled Data, it is possible to reduce the required amount of labeled data using the proposed embeddings 150, as they encode some domain knowledge. Accordingly, the current example describes a scenario in which insufficient labeled data (e.g., the ground truth reports 330) are available to train a fully supervised model either on the original scan reports or their embedding counterparts. This scenario falls under the realm of semi-supervised learning, and uses a semi-supervised learner 310 where the goal is to train a more generalizable classifier than one that is trained only on labeled data.

In the present example, let $D_L$ be the set of labeled data. Let $R_e \in D_L$ be a scan report, and $y_e$ be the corresponding label (such as whether e is malicious or benign). For each $R_e \in D_L$, the system generate K masks $m^1_e$, $m^2_e$, . . . , $m^K_e$ using the masked output predictor 132 from pretext task 1 with p=0.05—in other words, 5% of the mask vectors will have a value of 1 and will cause corruption of $R_e$. The model corrupts $R_e$ using the masks to obtain $R^c_e = \{R^{c1}_e, R^{c2}_e, \ldots, R^{cK}_e\}$. As handled, the label for both $R_e$ and each of the corruptions are the same. Accordingly, the system passes the original and corrupted scan reports, $R_e$ and $R_{ce}$, to the encoder 140 to get the respective embeddings $z_e$ and $Z_{ce} = \{Z^{c1}_e, Z^{c2}_e, \ldots, Z^{cK}_e\}$.

The predictor 132 is trained by passing $z_e$ and $Z^c_e$ with $y_e$ as the expected output for each. Let the predictions be $\tilde{y}_e$ and $\tilde{Y}^c_e = \{y^{c1}_e, y^{c2}_e, \ldots, y^{cK}_e\}$. The system uses cross entropy loss between the true label $y_e$ and the predicted label $\tilde{y}_e$, and applies the consistency loss between $\tilde{y}_e$ and $\tilde{Y}^c_e$, which penalizes when the predictions for the original scan report and its corruptions diverge. The system then updates the parameters of the predictor 132 by back-propagating both the supervised and consistency loss. This process is repeated for each $R_e \in DL$. In summary, the presently described solution leverages both the learned embeddings and the first pretext task to teach a semi-supervised learner 310 to mark candidate threat with labels 340 of benign or malicious. Experimentally, it has been observed that the semi-supervised learner 310 with as few as one hundred labeled data points achieves the same or superior performance as fully supervised classifiers, which require an order of magnitude more data to produce equivalent accuracy in assigning labels 340.

In the no labeled data scenario, the system detects malicious entities without any labeled data. Accordingly, the design of the system relies on the following insight—while it is hard to predict the maliciousness of an entity based on the early scan reports, it is often much easier to predict the maliciousness based on the scan reports after the stabilization period. In fact, one could use relatively simple predictors to achieve high accuracy for the late stage scan reports. While there have been a handful of unsupervised models for detecting malicious URLs, these models often do not achieve good results for early detection. The present disclosure addresses this conundrum through the predictor 134 for the second pretext task, which generates the future scan report.

In this example, let $R^t_e$ be the current scan report while $R^{t+\delta}_e$ is the output of the predictor 134 of the second pretext task. Let $z^t_e$ and $Z^{t+\delta}_e$ be their corresponding embeddings 150. Let $\tilde{z}_e$ be the concatenated vector $[z^t_e, z^{t+\delta}_e]$. As a pre-processing operation, the model computes the concatenated embeddings $\tilde{z}_e$ for all entities. Let Z be the set of concatenated embeddings for all entities.

Training an unsupervised learner 320 only based on $R^t_e$ or $z^t_e$ would result in sub-optimal performance. Instead, the system follows a three-step process for boosting knowledge transfer from pretext tasks. First, the model clusters all the vectors $\tilde{z}_e \in Z$ into two clusters 250a-b that correspond to malicious and benign entities, respectively. Let $C_1$ and $C_2$ be the cluster centroids. Second, for each $\tilde{z}_e$, the unsupervised learner 320 assigns it to one of the clusters 250a-b based on its proximity to $C_1$ and $C_2$. Finally, the unsupervised learner 320 trains a new predictor that takes embedding as input and outputs the cluster assignment. Specifically, the unsupervised learner 320 is trained over the set $\{(z^t_e, c_e)\}$, where $z^t_e$ is the embedding of the current scan report $R^t_e$ and $c_e$ is the cluster assignment. In other words, the unsupervised learner

320 trains a supervised model for predicting the cluster that an embedding must belong to. Once the unsupervised learner 320 obtains the two clusters 250a-b, the unsupervised learner 320 can identify the malicious cluster in one of two ways. If one expects the number of benign entities to be larger than that of malicious entities, then the larger cluster would correspond to the benign entity cluster. Alternatively, the unsupervised learner 320 could sample a small number of entities (such as 1-5) from either of the clusters 250a-b and verify them with some external repository (such as PhishTank or URLhaus) or obtain the appropriate label from the domain expert.

The present disclosure provides a unified framework that can aggregate the scan reports of diverse domains such as malware files, phishing URLs, malware URLs, and malicious IPs. The frameworks adapt recent innovations in generative modeling and self-supervised learning to ensure that the framework can work well even when labeled data is scarce or non-existent. Another significant contribution is the design of three pretext tasks that are carefully constructed to learn scanner dependencies and their temporal dynamics.

Figure 4:
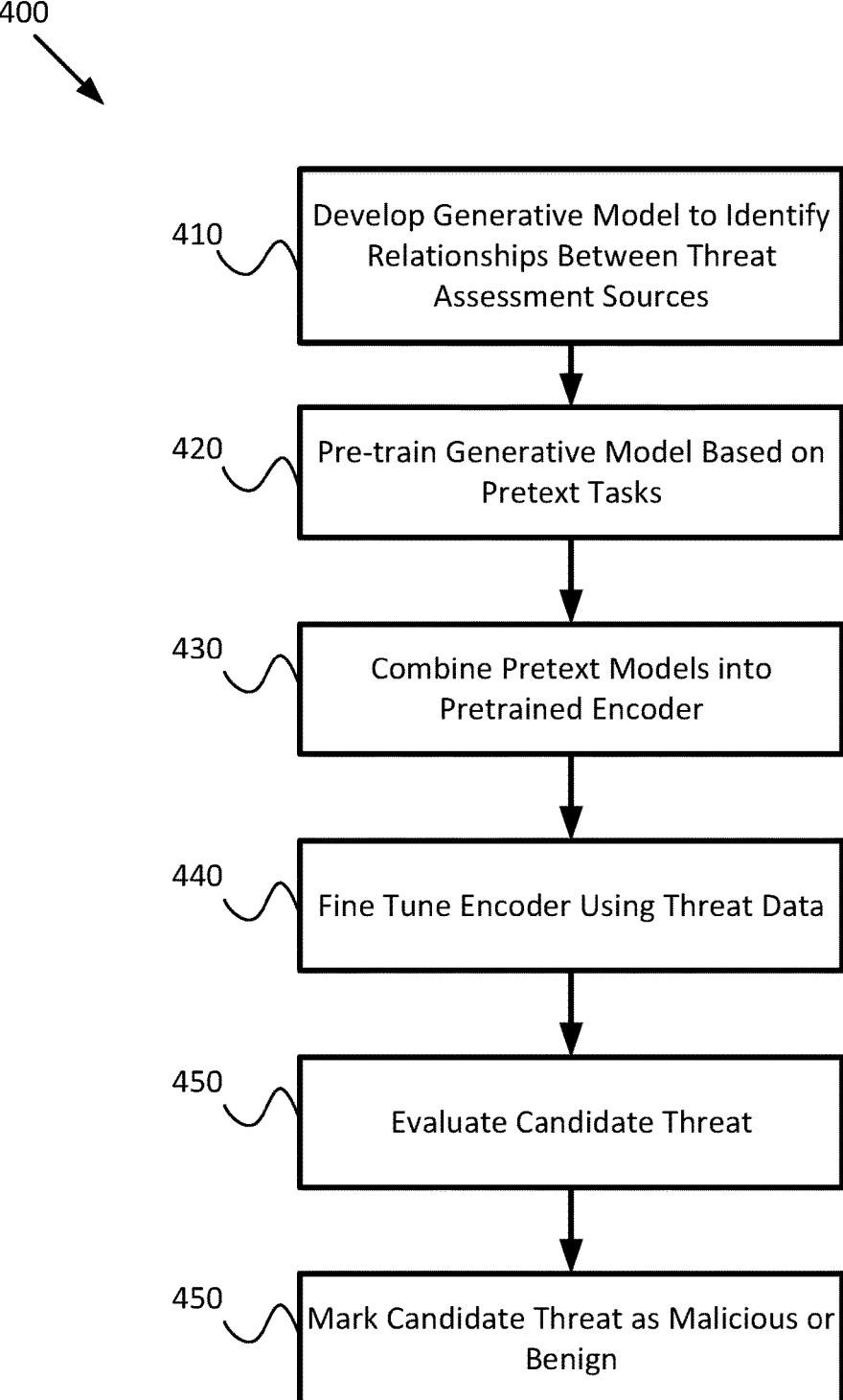
FIG. 4 is a flowchart of an example method, according to aspects of the present disclosure.

FIG. 4 is a flowchart of an example method 400, according to aspects of the present disclosure. The method 400 starts at block 410, where the system develops a generative model that identifies relationships between a plurality of threat assessment scanners.

At block 420, the system pre-trains a plurality of individual predictors based on a corresponding plurality of pretext tasks and the generative model. In various aspects, the pretext tasks include learning dependencies between the plurality of threat assessment scanners; modeling a temporal dynamic of threat reports from the plurality of threat assessment scanners; and learning a temporal consistency of a plurality of embeddings for threats evaluated by the plurality of threat assessment scanners.

At block 430, the system combines the combining the individual predictors into a pre-trained encoder.

At block 440, the system fine-tunes the pre-trained encoder using threat data for various entities. In some scenarios, the fine-tuning is performed as a semi-supervised learning task using the embeddings of the plurality of pretext tasks and a set of ground truth reports to identify how to classify the candidate threats as malicious or benign. In some scenarios, fine-tuning is performed as an unsupervised learning task that classifies the candidate threat into one of two clusters with other entities, wherein a first cluster of the two clusters is designated as containing benign entities and a second cluster of the two clusters is designated as containing malicious entities. In some aspects, the first cluster of the two clusters is designated as containing the benign entities and the second cluster of the two clusters is designated as containing the malicious entities based on external verification (e.g., via a third party or trusted security scanner) of a subset of entities in the two clusters as being malicious or benign. In some aspects, the first cluster of the two clusters is designated as containing the benign entities and the second cluster of the two clusters is designated as containing the malicious entities based on the first cluster containing more entities than the second cluster.

At block 450, the encoder (as fine-tuned per block 440) evaluates a candidate threat. In various aspects, the candidate threat may (if determined to be malicious) represent or include one or more of a phishing uniform URL, a malware URL, a malware file, and a blacklisted IP address.

At block 460, the encoder marks the candidate threat as one of benign or malicious. In various aspects, in response to marking the candidate threat as malicious, the system may prevent access to the candidate threat, quarantine any systems that have downloaded or accessed the candidate threat, or perform other computer security measures. In various aspects, in response to marking the candidate threat as benign, the system may allow access to the candidate threat, release from quarantine any systems that have downloaded or accessed the candidate threat, or perform other computer security measures.

Figure 5:
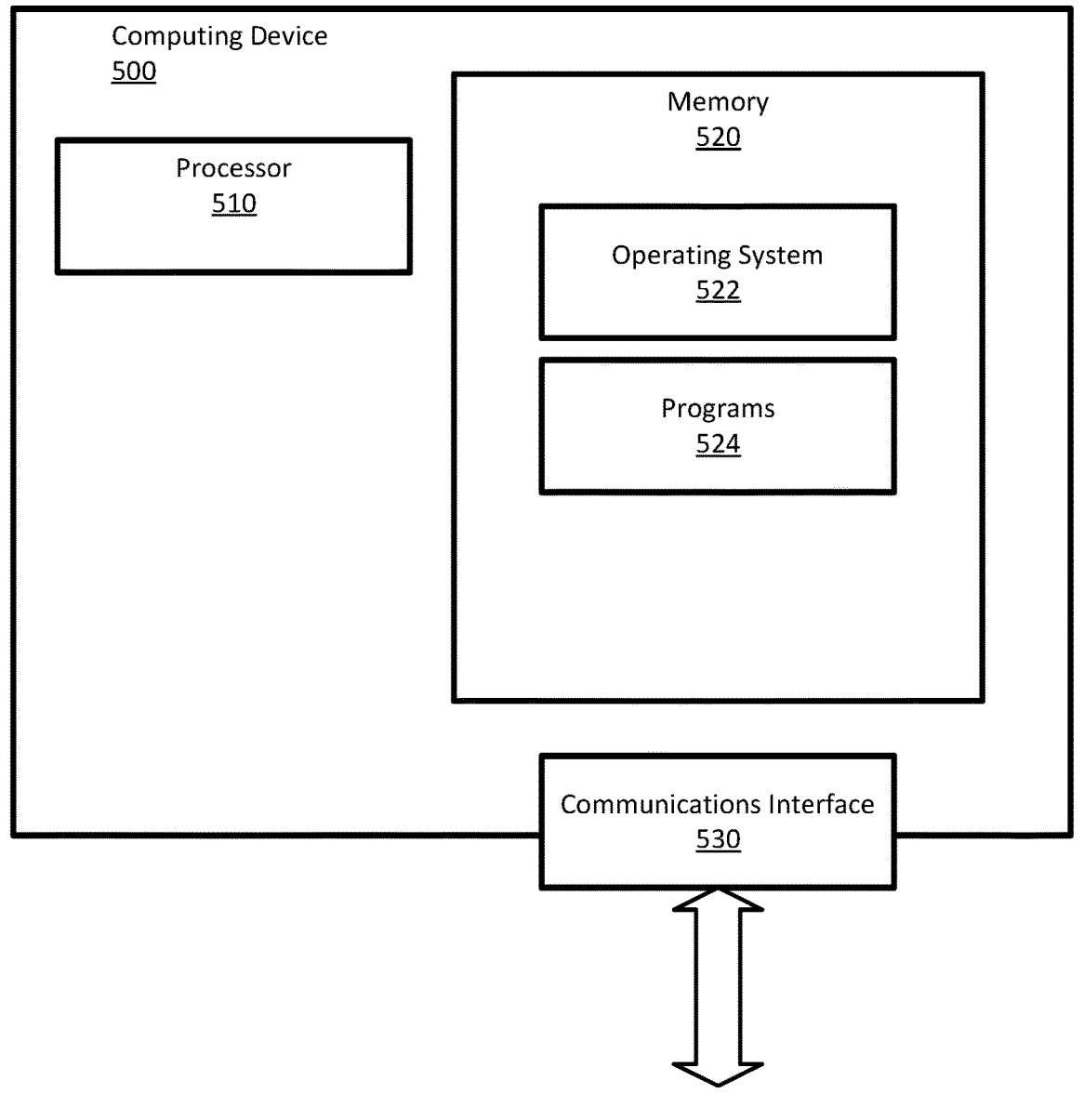
FIG. 5 illustrates a computer system, according to aspects of the present disclosure.

FIG. 5 illustrates a computer system, according to aspects of the present disclosure. FIG. 5 illustrates a computer system 500, such as may be used to perform method 200 described in relation to FIG. 4, according to aspects of the present disclosure. The computer system 500 may include at least one processor 510, a memory 520, and a communication interface 530. In various aspects, the physical components may offer virtualized versions thereof, such as when the computer system 500 is part of a cloud infrastructure providing virtual machines (VMs) to perform some or all of the tasks or operations described for the various devices in the present disclosure.

The processor 510 may be any processing unit capable of performing the operations and procedures described in the present disclosure. In various aspects, the processor 510 can represent a single processor, multiple processors, a processor with multiple cores, and combinations thereof. Additionally, the processor 510 may include various virtual processors used in a virtualization or cloud environment to handle client tasks.

The memory 520 is an apparatus that may be either volatile or non-volatile memory and may include RAM, flash, cache, disk drives, and other computer readable memory storage devices. Although shown as a single entity, the memory 520 may be divided into different memory storage elements such as RAM and one or more hard disk drives. Additionally, the memory 520 may include various virtual memories used in a virtualization or cloud environment to handle client tasks. As used herein, the memory 520 is an example of a device that includes computer-readable storage media, and is not to be interpreted as transmission media or signals per se.

As shown, the memory 520 includes various instructions that are executable by the processor 510 to provide an operating system 522 to manage various operations of the computer system 500 and one or more programs 524 to provide various features to users of the computer system 500, which include one or more of the features and operations described in the present disclosure. One of ordinary skill in the relevant art will recognize that different approaches can be taken in selecting or designing a program 524 to perform the operations described herein, including choice of programming language, the operating system 522 used by the computer system 500, and the architecture of the processor 510 and memory 520. Accordingly, the person of ordinary skill in the relevant art will be able to select or design an appropriate program 524 based on the details provided in the present disclosure.

The communication interface 530 facilitates communications between the computer system 500 and other devices, which may also be computer system 500 as described in relation to FIG. 5. In various aspects, the communication interface 530 includes antennas for wireless communications and various wired communication ports. The computer system 500 may also include or be in communication, via the communication interface 530, one or more input devices (e.g., a keyboard, mouse, pen, touch input device, etc.) and one or more output devices (e.g., a display, speakers, a printer, etc.).

Accordingly, the computer system 500 is an example of a system that includes a processor 510 and a memory 520 that includes instructions that (when executed by the processor 510) perform various aspects of the present disclosure. Similarly, the memory 520 is an apparatus that includes instructions that when executed by a processor 510 perform various aspects of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. A method, comprising:
developing a generative model that identifies relationships between a plurality of threat assessment scanners;
pre-training a plurality of individual encoders based on a corresponding plurality of pretext tasks and the generative model;
combining the individual encoders into a pre-trained encoder;
fine-tuning the pre-trained encoder using threat data; and
marking a candidate threat, as evaluated via the pretrained encoder as fine-tuned, as one of benign or malicious; and
in response to marking the candidate threat as malicious, quarantining a computing system identified as having downloaded or accessed the candidate threat.

2. The method of claim 1, wherein the plurality of pretext tasks comprise:
learning dependencies between the plurality of threat assessment scanners;
modeling a temporal dynamic of threat reports from the plurality of threat assessment scanners; and
learning a temporal consistency of a plurality of embeddings for threats evaluated by the plurality of threat assessment scanners.

3. The method of claim 1, wherein fine-tuning is performed as a semi-supervised learning task using a plurality embeddings from the plurality of pretext tasks and a set of ground truth reports.

4. The method of claim 1, wherein fine-tuning is performed as an unsupervised learning task that classifies the candidate threat into one of two clusters with other entities, wherein a first cluster of the two clusters is designated as containing benign entities and a second cluster of the two clusters is designated as containing malicious entities.

5. The method of claim 4, wherein the first cluster of the two clusters is designated as containing the benign entities and the second cluster of the two clusters is designated as containing the malicious entities based on external verification of a subset of entities in the two clusters as being malicious or benign.

6. The method of claim 4, wherein the first cluster of the two clusters is designated as containing the benign entities and the second cluster of the two clusters is designated as containing the malicious entities based on the first cluster containing more entities than the second cluster.

7. The method of claim 1, wherein the candidate threat includes at least one of:

a phishing uniform resource locator (URL);

a malware URL;

a malware file; and a blacklisted internet protocol address, and further comprising:

preventing a second computing device from accessing the candidate threat.

8. A system, comprising:

a processor; and a memory storage device including instructions that when executed by the processor perform operations comprising:

developing a generative model that identifies relationships between a plurality of threat assessment scanners;

pre-training a plurality of individual encoders based on a corresponding plurality of pretext tasks and the generative model;

combining the individual encoders into a pre-trained encoder;

fine-tuning the pre-trained encoder using threat data; and marking a candidate threat, as evaluated via the pre-trained encoder as fine-tuned, as one of benign or malicious; and in response to marking the candidate threat as malicious, quarantining a computing system identified as having downloaded or accessed the candidate threat.

9. The system of claim 8, wherein the plurality of pretext tasks comprise:

learning dependencies between the plurality of threat assessment scanners;

modeling a temporal dynamic of threat reports from the plurality of threat assessment scanners; and learning a temporal consistency of a plurality of embeddings for threats evaluated by the plurality of threat assessment scanners.

10. The system of claim 8, wherein fine-tuning is performed as a semi-supervised learning task using a plurality embeddings from the plurality of pretext tasks and a set of ground truth reports.

11. The system of claim 8, wherein fine-tuning is performed as an unsupervised learning task that classifies the candidate threat into one of two clusters with other entities, wherein a first cluster of the two clusters is designated as containing benign entities and a second cluster of the two clusters is designated as containing malicious entities.

12. The system of claim 11, wherein the first cluster of the two clusters is designated as containing the benign entities and the second cluster of the two clusters is designated as containing the malicious entities based on external verification of a subset of entities in the two clusters as being malicious or benign.

13. The system of claim 11, wherein the first cluster of the two clusters is designated as containing the benign entities and the second cluster of the two clusters is designated as containing the malicious entities based on the first cluster containing more entities than the second cluster.

14. The system of claim 8, wherein the candidate threat includes at least one of:

a phishing uniform resource locator (URL);

a malware URL;

a malware file; and a blacklisted internet protocol address, and further comprising:

preventing a second computing device from accessing the candidate threat.

15. A non-transitory memory including instructions that when executed by a processor perform operations, the operations comprising:

developing a generative model that identifies relationships between a plurality of threat assessment scanners;

pre-training a plurality of individual encoders based on a corresponding plurality of pretext tasks and the generative model;

combining the individual encoders into a pre-trained encoder;

fine-tuning the pre-trained encoder using threat data; and marking a candidate threat, as evaluated via the pre-trained encoder as fine-tuned, as one of benign or malicious; and in response to marking the candidate threat as malicious, quarantining a computing system identified as having downloaded or accessed the candidate threat.

16. The memory of claim 15, wherein the candidate threat includes at least one of:

a phishing uniform resource locator (URL);

a malware URL;

a malware file; and a blacklisted internet protocol address, and the operations further comprising:

preventing a second computing device from accessing the candidate threat.

17. The memory of claim 15, the operations further comprising:

marking a second candidate threat, as evaluated via the pre-trained encoder as fine-tuned, as one of benign or malicious; and in response to marking the second candidate threat as benign, releasing from quarantine a second computing system identified as having downloaded or accessed the candidate threat that was quarantined in response to accessing the second candidate threat.

18. The method of claim 1, further comprising:

marking a second candidate threat, as evaluated via the pre-trained encoder as fine-tuned, as one of benign or malicious; and in response to marking the second candidate threat as benign, releasing from quarantine a second computing system identified as having downloaded or accessed the candidate threat that was quarantined in response to accessing the second candidate threat.

19. The method of claim 1, further comprising:

marking a second candidate threat, as evaluated via the pre-trained encoder as fine-tuned, as one of benign or malicious; and permitting a second computing system requesting access to the second candidate threat to access the second candidate threat in response to marking the second candidate threat as benign.

* * * * *